(12) United States Patent
Yoshida et al.

(10) Patent No.: US 12,294,062 B2
(45) Date of Patent: May 6, 2025

(54) BATTERY SYSTEM AND METHOD FOR EQUALIZATION OF BATTERY PACK

(71) Applicants: TOYOTA JIDOSHA KABUSHIKI KAISHA, Toyota (JP); SUBARU CORPORATION, Tokyo (JP)

(72) Inventors: Hiroshi Yoshida, Anjo (JP); Takahiko Nakagawa, Seto (JP); Kenta Uwai, Shibuya-ku Tokyo-to (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 597 days.

(21) Appl. No.: 17/698,396

(22) Filed: Mar. 18, 2022

(65) Prior Publication Data

US 2022/0311058 A1   Sep. 29, 2022

(30) Foreign Application Priority Data

Mar. 23, 2021  (JP) .................... 2021-048041

(51) Int. Cl.
*H02J 7/00* (2006.01)
*B60L 58/22* (2019.01)
*H01M 10/42* (2006.01)
*H02J 7/14* (2006.01)

(52) U.S. Cl.
CPC .......... *H01M 10/425* (2013.01); *B60L 58/22* (2019.02); *H02J 7/0019* (2013.01); *H02J 7/1423* (2013.01); *B60L 2240/547* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2010/0079116 A1* | 4/2010 | Thivierge | B60L 58/22 320/153 |
| 2014/0266062 A1* | 9/2014 | Lee | H02J 7/0016 320/134 |
| 2015/0008886 A1* | 1/2015 | Kim | B60L 58/22 320/136 |
| 2020/0346552 A1 | 11/2020 | Luo et al. | |

FOREIGN PATENT DOCUMENTS

| | | |
|---|---|---|
| CN | 301824002 S | 2/2012 |
| CN | 103390909 A | 11/2013 |
| CN | 110682831 A | 1/2020 |
| JP | 2007-244058 A | 9/2007 |
| JP | 2015-041513 A | 3/2015 |
| JP | 2015-177615 A | 10/2015 |
| JP | 2020-018089 A | 1/2020 |

* cited by examiner

*Primary Examiner* — Arun C Williams
(74) *Attorney, Agent, or Firm* — Dinsmore & Shohl LLP

(57) ABSTRACT

A battery system comprises a battery pack, an equalization unit, and a battery ECU. The battery pack includes a plurality of blocks connected in series. The equalization unit performs equalization control to equalize the plurality of blocks in voltage. The battery ECU obtains a determined equalization time, and controls the equalization unit to end the equalization control when the equalization time has elapsed since the equalization control was started.

8 Claims, 5 Drawing Sheets

BATTERY SYSTEM AND METHOD FOR EQUALIZATION OF BATTERY PACK

CROSS REFERENCE TO RELATED APPLICATIONS

This nonprovisional application claims priority to Japanese Patent Application No. 2021-048041 filed on Mar. 23, 2021 with the Japan Patent Office, the entire contents of which are hereby incorporated by reference.

BACKGROUND

Field

The present disclosure relates to a battery system and a method for equalization of a battery pack.

Description of the Background Art

Japanese Patent Laying-Open No. 2015-177615 discloses a voltage equalizer which charges or discharges each battery of a plurality of series-connected batteries of a battery pack to equalize each battery in voltage. The voltage equalizer includes a correction value setting means. The correction value setting means sets a first correction value and a second correction value for an equalization target voltage at which each battery is equalized in voltage. The first correction value is provided to address a change in voltage due to an internal resistance of each battery caused by a direct current of charging or discharging the battery. The second correction value is provided to address a change in voltage due to polarization. The second correction value is equal to or less than an accuracy threshold that defines a predetermined accuracy for the equalization target voltage, and it is larger than 0.

SUMMARY

For example, the voltage equalizer disclosed in Japanese Patent Laying-Open No. 2015-177615 executes equalization control while monitoring whether a battery attains a target voltage. Once the battery has attained the target voltage, the voltage equalizer ends the equalization control.

However, in general, when a battery conducts, voltage detection accuracy decreases as compared with that when the battery does not conduct. Therefore, when the battery conducts, it may not be possible to accurately determine whether the equalization control may be ended.

The present disclosure has been made in order to solve such a problem, and an object of the present disclosure is to highly accurately determine whether equalization control may be ended.

(1) According to a first aspect of the present disclosure, a battery system comprises a battery pack, an equalizer, and a controller. The battery pack includes a plurality of blocks connected in series. The equalizer is configured to execute equalization control to equalize the plurality of blocks in voltage. The controller obtains a determined equalization time, and controls the equalizer to end the equalization control when the equalization time has elapsed since the equalization control was started.

In the configuration (1), the controller ends the equalization control based on time (the equalization time) rather than voltage. Thus, when the equalization control is ended can be determined irrespective of an effect that conduction of the battery pack has on accuracy of detection of the voltage of each block. Thus, according to the configuration (1), whether the equalization control may be ended can be determined with high accuracy.

(2) The battery system comprises a voltage sensor that senses the voltage of each of the plurality of blocks. The equalizer includes a plurality of switching elements each connected to a respective one of the plurality of blocks in parallel, and a plurality of discharge resistors each connected to a respective one of the plurality of switching elements in series. The equalization time is determined based on a resistance of the plurality of discharge resistors and a detection error of the voltage sensor.

When a target voltage difference is set to be excessively small, the equalization control is continued for longer than necessary, and the power stored in the battery pack may be wastefully consumed (as will be described hereinafter more specifically). In the configuration (2), in contrast, a target voltage difference is determined based on a detection error of a plurality of voltage sensors, which can prevent the equalization control from being continued unnecessarily long. Thus, according to the configuration (2), the equalization control can be ended before the power stored in the battery pack is wastefully consumed.

(3) The equalization time is a fixed value determined based on an upper limit value of a voltage use range of the plurality of blocks.

According to the configuration (3), setting the equalization time as a fixed value eliminates the necessity of performing a process of an operation to calculate the equalization time, and can thus reduce a load of an operation on the controller.

(4) The battery system further comprises a relay that switches electrical connection to electrical disconnection and vice versa between the battery pack and a load. The equalization control is a process in which when the plurality of blocks have a first block and a second block with a voltage difference larger than a threshold value, the first block being higher in voltage than the second block, the first block is discharged by conducting one of the plurality of switching elements which is connected to the first block in parallel. The controller sets the threshold value depending on a period of time elapsing after the battery pack is electrically disconnected from the load before the battery pack is electrically connected to the load.

In the configuration (4), whether the equalization control may be started is determined in consideration of a period of time elapsing after the battery pack is electrically disconnected from the load before the battery pack is electrically connected to the load. The longer the elapsing period of time is, the more the battery pack's polarization is alleviated, and a voltage difference between the blocks can be detected with high accuracy. Thus, according to the configuration (4), by considering the length of the elapsing period of time (that is, the degree of reduction of an effect of polarization of the battery pack), whether the equalization control may be started can be determined with high accuracy.

(5) The battery system further comprises a temperature sensor that senses the temperature of the battery pack. The controller sets a threshold value depending on the elapsing period of time and the temperature of the battery pack.

According to the configuration (5), the dependency of alleviation of polarization of the battery pack on temperature is also considered, and whether the equalization control may be started can be determined with higher accuracy.

(6) The battery system further comprises a relay that switches electrical connection to electrical disconnection and vice versa between the battery pack and a load. The equalization time is a variable value determined based on a voltage difference between the plurality of blocks obtained before the battery pack is electrically connected to the load by the relay.

According to the configuration (6), the equalization time is a variable value, and when it is compared with the equalization time that is a fixed value, the former can increase a load of an operation on the controller, however, it can be set with high accuracy in accordance with the voltage difference between the plurality of blocks.

(7) The equalization control is a process in which when the plurality of blocks have a first block and a second block with a voltage difference larger than a threshold value, the first block being higher in voltage than the second block, the first block is discharged by conducting one of the plurality of switching elements which is connected to the first block in parallel. The controller sets the threshold value depending on a period of time elapsing after the battery pack is electrically disconnected from a load before the battery pack is electrically connected to the load.

According to the configuration (7), as well as the configuration (4), whether the equalization control may be started can be determined with high accuracy.

(8) The battery system further comprises a temperature sensor that senses the temperature of the battery pack. The controller sets a threshold value depending on the elapsing period of time and the temperature of the battery pack.

According to the configuration (8), as well as the configuration (5), whether the equalization control may be started can be determined with higher accuracy.

(9) According to a second aspect of the present disclosure, in a method for equalization of a battery pack, the battery pack includes a plurality of blocks connected in series and is configured such that equalization control is executed by an equalizer. The equalization method comprises: starting the equalization control; obtaining a determined equalization time; and ending the equalization control when the equalization time has elapsed since the equalization control was started.

According to the method according to (9), as well as the configuration (1), whether the equalization control may be ended can be determined with high accuracy.

The foregoing and other objects, features, aspects and advantages of the present disclosure will become more apparent from the following detailed description of the present disclosure when taken in conjunction with the accompanying drawings.

DETAILED DESCRIPTION

The present disclosure will now be described in embodiments hereinafter in detail with reference to the drawings. In the figures, identical or corresponding components are identically denoted and will not be described repeatedly.

Hereinafter, a configuration in which a battery system according to the present embodiment is mounted in a battery electric vehicle will be described as an example. It should be noted, however, that the battery system according to the present embodiment is applicable not only to a battery electric vehicle, but also generally applicable to vehicles in which a battery pack is mounted for travelling (such as a hybrid electric vehicle, a plug-in hybrid electric vehicle, and a fuel cell electric vehicle). Further, the battery system according to the present embodiment is not limited in use to a vehicle, and may for example be stationary.

Embodiments

<General Configuration of Vehicle>

Figure 1:
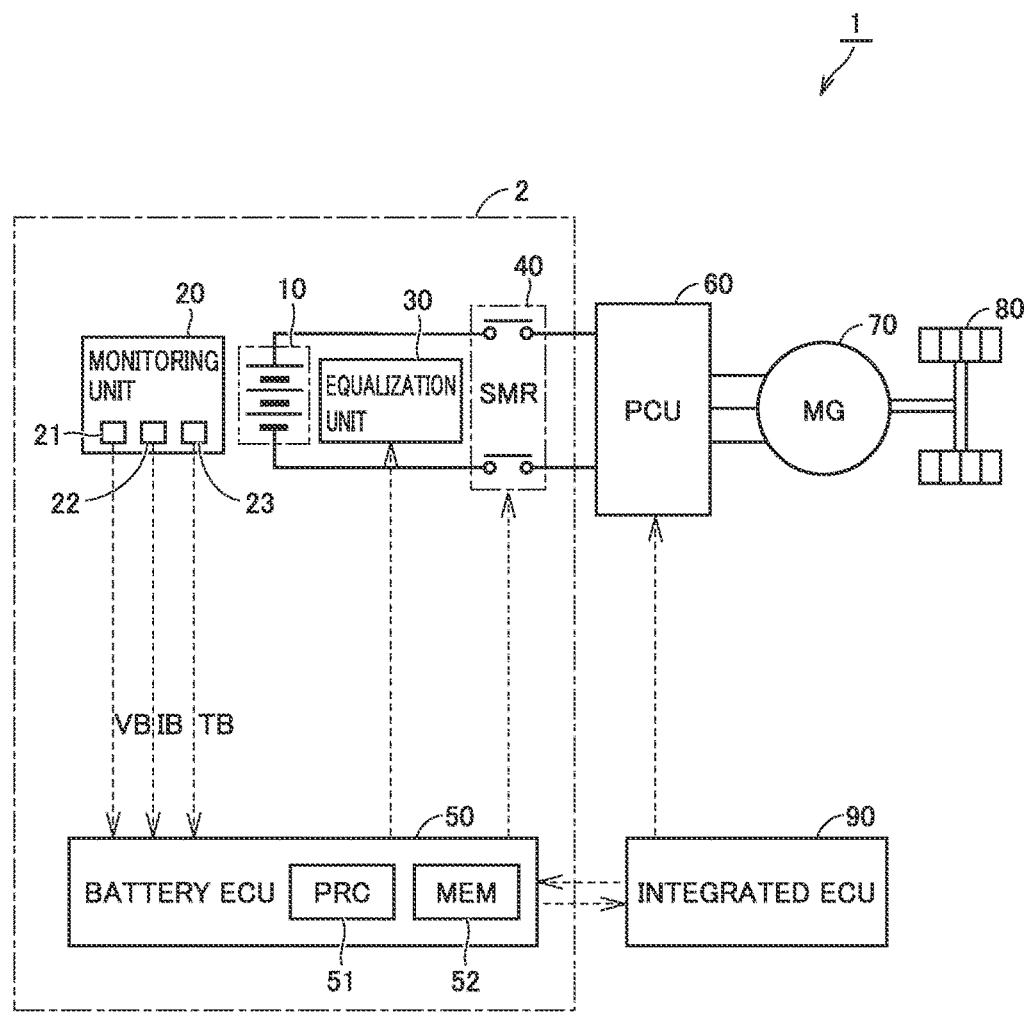
FIG. 1 is a diagram schematically showing a general configuration of a vehicle in which a battery system according to an embodiment is mounted.

FIG. 1 is a diagram schematically showing a general configuration of a vehicle in which a battery system according to the present embodiment is mounted. Referring to FIG. 1, a vehicle 1 is a battery electric vehicle and comprises a battery system 2. Battery system 2 includes a battery pack 10, a monitoring unit 20, an equalization unit 30, a system main relay (SMR) 40, and a battery electronic control unit (battery ECU) 50. Vehicle 1 further comprises a power control unit (PCU) 60, a motor generator 70, a driving wheel 80, and an integrated ECU 90.

Figure 2:
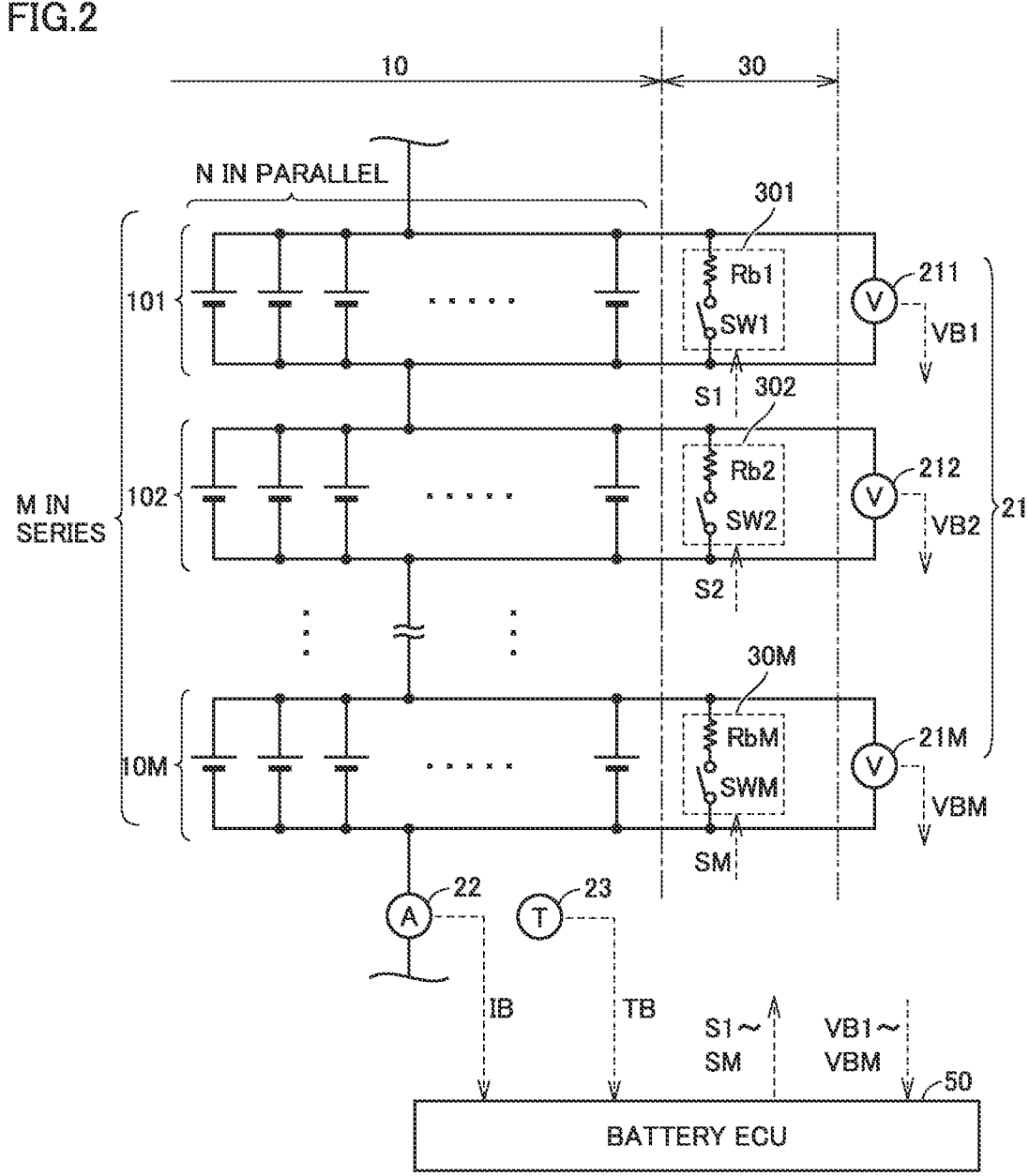
FIG. 2 is a diagram for illustrating a configuration of the battery system in more detail.

Battery pack 10 includes a plurality of blocks 101 to 10M connected in series (see FIG. 2). Battery pack 10 stores power for driving motor generator 70, and supplies power to motor generator 70 through PCU 60. Battery pack 10 is charged with power generated by motor generator 70 and received via PCU 60.

Monitoring unit 20 includes a voltage sensor group 21 (a plurality of voltage sensors 211 to 21M described hereinafter), a current sensor 22, and a temperature sensor 23. Voltage sensor group 21 senses the voltage of each block constituting battery pack 10. Current sensor 22 senses a current 1B input to and output from battery pack 10. Temperature sensor 23 senses the temperature of battery pack 10. Each sensor outputs its sensed result to battery ECU 50.

Equalization unit (an equalizer) 30 is provided to eliminate unequality in state of charge (SOC) between the plurality of blocks constituting battery pack 10. More specifically, in battery pack 10, as time elapses, variation in SOC can be caused between the plurality of blocks due to variation of a self-discharge current, variation of a current consumed by voltage sensor group 21, or the like. Variation in voltage between the plurality of blocks can also be caused by variation in efficiency of charging. Equalization unit 30 operates in response to a control command received from battery ECU 50 to discharge any block (one or more blocks) of the plurality of blocks in order to eliminate unequality in SOC. Detailed configurations of battery pack 10, monitoring unit 20, and equalization unit 30 will be described with reference to FIG. 2. Note that there is a correlation between SOC and OCV (Open Circuit Voltage), that is, as SOC increases, OCV also monotonously increases, and accordingly, OCV may be the target of equalization.

SMR 40 is electrically connected to a power line interconnecting battery pack 10 and PCU 60. SMR 40 operates in response to a control command received from battery ECU 50 to switch supplying power to interrupting power and vice versa between battery pack 10 and PCU 60. Note that SMR 40 corresponds to the presently disclosed "relay."

Battery ECU 50 includes a processor 51 such as a central processing unit (CPU), a memory 52 such as a read only memory (ROM) and a random access memory (RAM), and an input/output port (not shown) for inputting and outputting a variety of signals. Battery ECU 50 manages battery pack 10 based on signals received from the sensors of monitoring unit 20 as well as a program and a map (described hereinafter) stored in memory 52. Main control executed by battery ECU 50 includes "equalization control" for battery pack 10. Details of the equalization control will be described hereinafter. Note that battery ECU 50 corresponds to the presently disclosed "controller."

PCU 60 operates in response to a control command received from integrated ECU 90 to perform bidirectional power conversion between battery pack 10 and motor generator 70. PCU 60 includes, for example, a converter (not shown) that increases direct-current power of battery pack 10 in voltage, and an inverter (not shown) that converts the direct-current power increased in voltage by the converter to alternating-current power and outputs the alternating-current power to motor generator 70. PCU 60 is an example of the presently disclosed "load."

Motor generator 70 is an alternating-current rotating electric machine, and is, for example, a three-phase alternating-current synchronous electric motor including a rotor and a permanent magnet embedded in the rotor. Motor generator 70 is driven by power received from battery pack 10. Motor generator 70 provides driving force which is in turn transmitted to driving wheel 80. In contrast, motor generator 70 performs regenerative power generation when vehicle 1 is braked or travels downhill and its acceleration is reduced or the like. Motor generator 70 generates power which is in turn supplied to battery pack 10 via PCU 60.

As well as battery ECU 50, integrated ECU 90 also includes a processor, a memory, and an input/output port, none of which is shown. Integrated ECU 90 generally controls vehicle 1 in cooperation with battery ECU 50 based on signals received from a variety of sensors as well as a program and a map stored in the memory. Integrated ECU 90 may be configured to be divided by function, or may be configured integrally with battery ECU 50.

<Configuration of Battery System>

FIG. 2 is a diagram for illustrating a configuration of battery system 2 in more detail. In battery pack 10, a plurality of cells are connected in parallel to form a block (also referred to as a stack or a module). A plurality of such blocks are connected in series to form battery pack 10.

More specifically, battery pack 10 includes M blocks 101 to 10M connected in series. Each of blocks 101-10M includes N cells connected in parallel. M and N are natural numbers of 2 or more. In some embodiments of the present disclosure, however, a battery pack may not include cells connected in parallel, and N may be equal to one.

Each cell is a lithium ion battery. Although not shown, adjacent cells are electrically connected by a bus bar and also mechanically coupled together. A fuse (not shown) is connected to each cell in series. When an excessively large current passes, the fuse interrupts a current path of the cell. Further, a current interrupt device (CID) (not shown) is provided inside each cell. The CID is configured to interrupt a current path when a battery case internally attains pressure higher than a predetermined value.

Voltage sensor 211 senses voltage VB1 of block 101. That is, voltage sensor 211 senses voltage of the N cells constituting block 101. Voltage sensors 212 to 21M are similarly discussed. Current sensor 22 senses a current IB passing through blocks 101 to 10M. Temperature sensor 23 senses temperature TB of battery pack 10 at a predetermined position.

Equalization unit 30 includes equalization circuits 301 to 30M. Equalization circuit 301 is connected to block 101 in parallel and, as well as a typical equalization circuit, includes a discharge resistor Rb1 and a switching element (such as a transistor) SW1. The other equalization circuits 302 to 30M are similarly discussed.

When battery ECU 50 receives voltages VB1 to VBM of blocks 101 to 10M from voltage sensors 211 to 21M, battery ECU 50 controls equalization circuits 301 to 30M to discharge each block until voltages VB1 to VBM are substantially equal to one another. This control will be referred to as "equalization control." In FIG. 2, a control command for the equalization control are denoted by Si to SM. Executing the equalization control can resolve unequality between blocks 101 to 10M in SOC.

<Condition for Ending Equalization Control>

The equalization control may be executed while monitoring voltages VB1 to VBM of blocks 101 to 10M, and the equalization control may be ended when a block subject to the equalization control attains a target voltage. When battery pack 10 conducts, however, voltage drop and polarization occur, and accordingly, accuracy of voltage detection decreases as compared with that when battery pack 10 does not conduct. Therefore, when battery pack 10 conducts, whether the equalization control may be ended may not be accurately determined.

Accordingly, in the present embodiment, the equalization control is ended under a condition as determined depending on a period of time elapsing since executing the equalization control is started, rather than voltages VB1 to VBM of blocks 101 to 10M. More specifically, battery ECU 50 ends the equalization control when executing the equalization control is started and thereafter an equalization time determined depending on a value in resistance of discharge resistors Rb1 to RbM, a detection error of voltage sensor group 21, and the like elapses. Hereinafter, this control will be described in detail.

Figure 3:
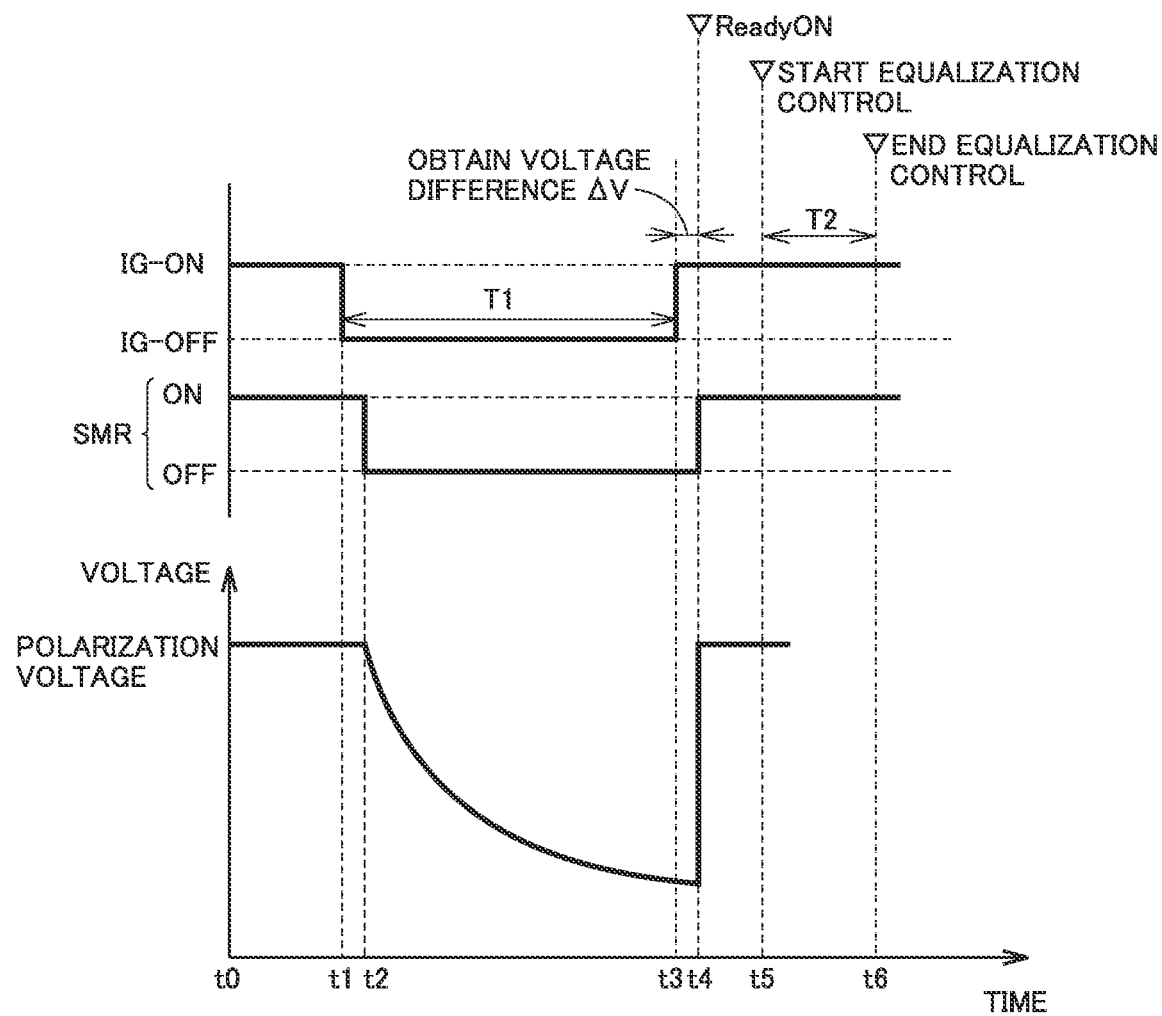
FIG. 3 is timing plots representing a series of steps involved in equalization control in the present embodiment.

FIG. 3 is timing plots representing a series of steps involved in the equalization control in the present embodiment. In FIG. 3, the horizontal axis represents an elapsing period of time. The vertical axis schematically represents the polarization voltage of a representative block included in battery pack 10. FIG. 3 shows a state of ignition-on (IG-ON)/ignition-off (IG-OFF) of vehicle 1 and a state of closing (ON)/opening (OFF) of SMR 40.

In FIG. 3, to facilitate understanding, it is assumed that battery pack 10 is composed of two blocks (that is, battery pack 10 only includes blocks 101 and 102).

At initial time t0, vehicle 1 is in an IG-ON state and SMR 40 is closed. At time t1, the user performs IG OFF operation of vehicle 1, and in response, SMR 40 is opened (at time t2). Accordingly, blocks 101 and 102 are electrically disconnected from PCU 60, and thus in a state free of any load (or a no-conducting state). A period of time elapsing after vehicle 1 is in an IG OFF state before it is next in an IG ON state will be referred to as an "IG-OFF time T1." IG-OFF time T1 can be regarded as a period of time for which blocks 101 and 102 are let stand free of any load.

After time t2 et seq., blocks 101 and 102 have polarization voltage decreasing as time elapses. In general, normally, it is necessary to let a battery stand for several tens of minutes before the battery's polarization is relaxed to some extent. It normally takes several hours before a battery's polarization is sufficiently relaxed (or resolved).

At time t3, the user performs IG ON operation of vehicle 1. Then, vehicle 1 shifts to a ReadyON state, and SMR 40 is closed (time t4). Thus, blocks 101 and 102 are electrically connected to PCU 60, and become a conducting state (a state in which charging and discharging can be performed).

A voltage difference $\Delta V$ (=|VB1−VB2|) between voltage VB1 of block 101 and voltage VB2 of block 102 is obtained for a short period of time elapsing after the IG-ON operation is performed before SMR 40 is closed (a period of time between time t3 and time t4). When voltage difference $\Delta V$ obtained is larger than a threshold value TH, it is determined that the equalization control is executed.

When estimating battery pack 10's full charge capacity, the SOCs of blocks 101 to 10M are used. A use range is predetermined for the SOCs of blocks 101 to 10M. All blocks 101 to 10M are charged and discharged so that the SOCs fall within the use range. When the SOC of any of blocks 101 to 10M (that is, the highest SOC) reaches the upper limit value of the use range, battery pack 10 cannot be charged any more. When the SOC of any block (that is, the lowest SOC) reaches the lower limit of the use range, battery pack 10 cannot be discharged any more. Therefore, when blocks 101 to 10M are unequal in SOC a substantially smaller SOC use range is provided and as a result vehicle 1 as an EV travels a shorter distance than when blocks 101 to 10M are equal in SOC. Therefore, it is desirable to execute the equalization control before an EV travel distance is affected (typically, before an EV travel distance is excessively reduced). By setting threshold value TH to an appropriate value, unequality in SOC can be sensed even with an effect of polarization considered, and whether it is necessary to perform the equalization control can be determined accurately. Threshold value TH may be a variable value calculated as will be described hereinafter, or may be a fixed value set based on a result of a previously conducted experiment.

In the example shown in FIG. 3, voltage difference $\Delta V$ is larger than threshold value TH, and accordingly, the equalization control is started at time t5. In the present embodiment, the equalization control is started at time t5 and thereafter at time t6, when an "equalization time T2" elapses, the equalization control ends. Equalization time T2 can be determined as follows:

Referring again to FIG. 2, an example in which a target of the equalization control is block 101 will be described. When battery ECU 50 outputs an equalization command 51 to equalization unit 30, switching element SW1 is turned on, and a current flows through discharge resistor Rb1. This current I will have a magnitude having a value obtained by dividing a value of a difference between voltage difference $\Delta V$ and a target voltage difference $\Delta V$tag by a resistance of discharge resistor Rb1 according to Ohm's law (see the following expression (1)):

$$I=(\Delta V-\Delta V\text{tag})/Rb1 \quad (1).$$

Target voltage difference $\Delta V$tag is a value that previously determines a desired extent to which a voltage difference between voltage VB1 of block 101 and that of another block is reduced by executing the equalization control for block 101. Target voltage difference $\Delta V$tag will now be described in more detail.

Each of voltage sensors 211 to 21M constituting voltage sensor group 21 has a detection error. The detection error of voltage sensors 211 to 21M is, for example, about 5 mV. When voltage difference $\Delta V$ is smaller than the detection error of voltage sensors 211 to 21M, whether voltage difference $\Delta V$ is actually caused or voltage difference $\Delta V$ is caused by the detection error of voltage sensors 211 to 21M is undistinguishable. Therefore, it can be said that setting target voltage difference $\Delta V$tag to a value smaller than the detection error of voltage sensors 211 to 21M is an excessive target setting. Rather, when target voltage difference $\Delta V$tag is set to a value smaller than the detection error of voltage sensors 211 to 21M, the equalization control is executed for a longer period of time than necessary, and as a result, power stored in battery pack 10 is wastefully consumed, which may reduce an EV travel distance of vehicle 1. Therefore, target voltage difference $\Delta V$tag can be set to a value equal to or larger than the detection error of voltage sensors 211 to 21M, and, in some embodiments, set to a value equivalent to the detection error of voltage sensors 211 to 21M (5 mV in this example).

In expression (1), the resistance of discharge resistor Rb1 is a value according to the specifications of discharge resistor Rb1. Target voltage difference $\Delta V$tag is a value determined in advance depending on the detection error of voltage sensors 211 to 21M. Thus, both the resistance of discharge resistor Rb1 and target voltage difference $\Delta V$tag are known fixed values. Therefore, once voltage difference $\Delta V$ has been determined, current I is also determined in magnitude. A period of time required for equalizing block 101 depends on the magnitude of current I. The larger current I is, the shorter the period of time required for equalizing block 101 is. Therefore, equalization time T2 depending on voltage difference $\Delta V$ can be calculated by previously, experimentally obtaining a relationship between the time required for equalizing block 101 (i.e., equalization time T2) and the magnitude of current I. In this case, equalization time T2 is set longer as voltage difference $\Delta V$ increases.

It should be noted, however, that in some embodiments, the equalization time T2 may not be variable set depending on voltage difference $\Delta V$. Equalization time T2 may be a fixed value. As has been discussed above, when voltage difference $\Delta V$ is resolved and thereafter the equalization control is still continued, power stored in battery pack 10 may be wastefully consumed, and therefore, it is desirable that the equalization control be not executed for an excessively long period of time. Note that the equalization requires a shorter period of time as current I increases. Accordingly, by assuming that current I has an upper limit value of a range of a current normally used, equalization time T2 can be set so as not to be excessively long. In the present embodiment, each cell is a lithium ion battery, and accordingly, equalization time T2 may be set, assuming current I flowing when block 101 has voltage of an upper limit value of a voltage use range of the lithium ion battery (i.e., about 4 V).

<Control Flow>

Figure 4:
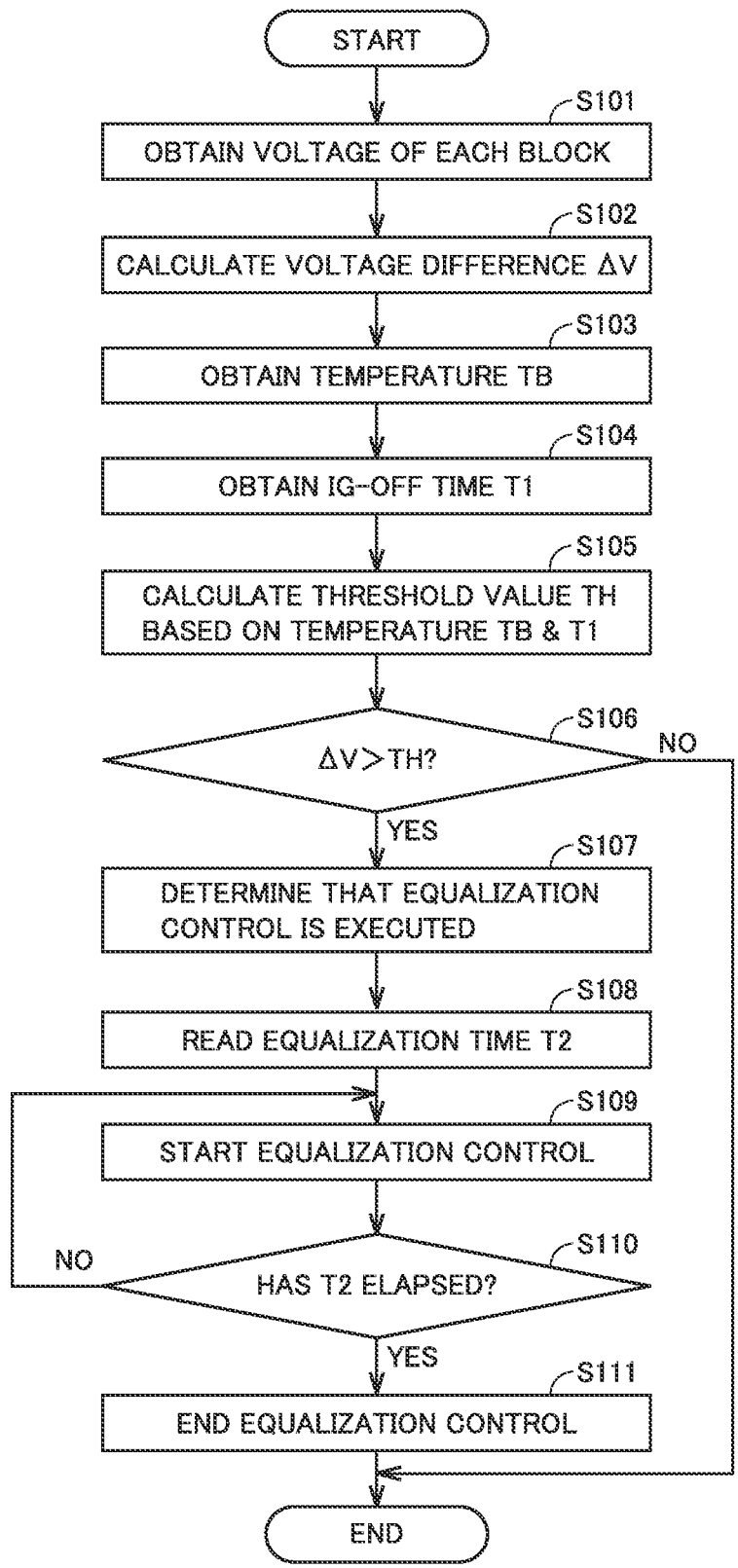
FIG. 4 is a flowchart showing an example of a series of steps involved in the equalization control in the present embodiment.

FIG. 4 is a flowchart showing an example of a series of steps involved in the equalization control in the present embodiment. The flowchart shown in FIG. 4 (and FIG. 5 subsequent thereto) is executed when a predetermined condition is established (specifically, when the IG-ON operation is performed). While each step is implemented by software processing performed by battery ECU 50, it may be implemented by hardware (an electrical circuit) fabricated in battery ECU 50. Hereinafter, a step is abbreviated as S.

In S101, battery ECU 50 obtains from voltage sensor group 21 voltages VB1 to VBM of blocks 101 to 10M constituting battery pack 10. Battery ECU 50 then calculates voltage difference $\Delta V$ between voltages VB1 to VBM (S102). More specifically, voltage difference $\Delta V$ is a voltage difference between a highest voltage and a lowest voltage of voltages VB1 to VBM.

In S103, battery ECU 50 obtains temperature TB of battery pack 10 from temperature sensor 23. Further, battery ECU 50 uses a timer (not shown) to obtain IG-OFF time T1 in vehicle 1 (S104).

In S105, battery ECU 50 calculates threshold value TH based on temperature TB obtained in S103 and IG-OFF time T1 obtained in S104. A map (not shown) in which a relationship between temperature TB, IG-OFF time T1, and threshold value TH is determined is created by previously performing an experiment, and stored in memory 52. By referring to this map, battery ECU 50 can calculate threshold value TH from temperature TB and IG-OFF time T1.

As temperature TB of battery pack 10 is higher, polarization of battery pack 10 is more easily relaxed. As IG-OFF time T1 is longer, polarization of battery pack 10 is more easily relaxed. Therefore, the higher temperature TB of battery pack 10 is, and the longer IG-OFF time T1 is, the smaller the effect of polarization is. Thus, each block's voltage can be sensed with high accuracy, and the error of voltage difference $\Delta V$ becomes small. Therefore, in the map, threshold value TH can be set to be smaller as temperature TB of battery pack 10 is higher and IG-OFF time T1 is longer.

In S106, battery ECU 50 determines whether voltage difference $\Delta V$ calculated in S102 is larger than threshold value TH. When voltage difference $\Delta V$ is equal to or less than threshold value TH (NO in S106), blocks 101 to 10M have small unequality in SOC, and accordingly, the equalization control need not be executed. Accordingly, battery ECU 50 ends the series of steps without executing the subsequent steps. When voltage difference $\Delta V$ is larger than threshold value TH (YES in S106), battery ECU 50 determines to execute the equalization control (S107).

In S108, battery ECU 50 reads equalization time T2 as predetermined (a fixed value) from memory. Equalization time T2 is a value determined so as not to be excessively long, assuming that each of blocks 101 to 10M has voltage of an upper limit value of a normal voltage use range (about 4 V for a lithium ion battery).

In S109, battery ECU 50 starts the equalization control. The equalization control is continued until equalization time T2 elapses since the equalization control has been started (NO in S110). Once equalization time T2 has elapsed (YES in S110), battery ECU 50 ends the equalization control (S111). This completes the series of steps. Note that a similar control can be applied to two or more blocks so that a voltage difference between any two of blocks 101 to 10M is smaller than threshold value TH.

Figure 5:
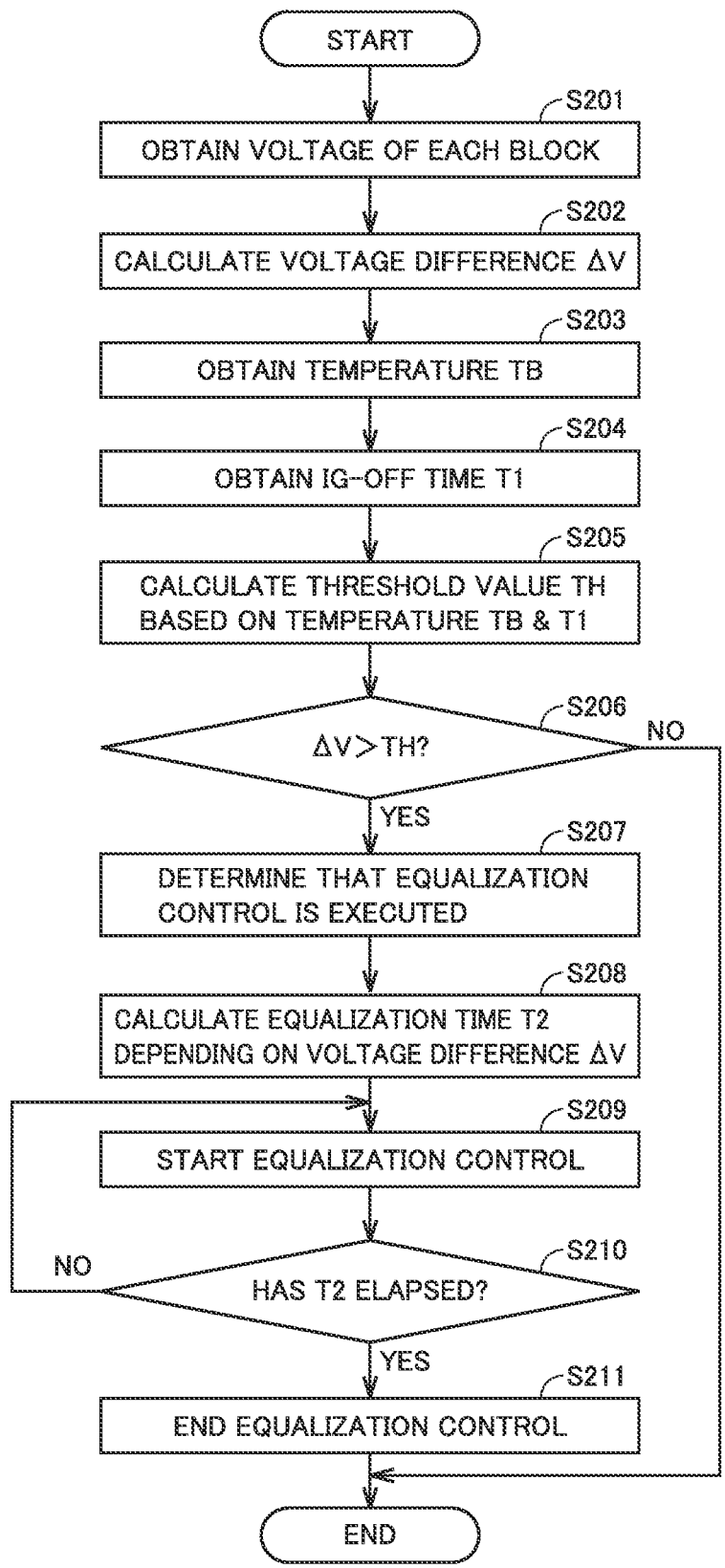
FIG. 5 is a flowchart showing another example of a series of steps involved in the equalization control in the present embodiment.

FIG. 5 is a flowchart showing another example of a series of steps involved in the equalization control in the present embodiment. Steps S201 to S207 are equivalent to steps S101 to S107 in FIG. 4, and accordingly, will not be described repeatedly.

When voltage difference $\Delta V$ is larger than threshold value TH, and accordingly, it is determined that the equalization control is executed, battery ECU 50 calculates equalization time T2 depending on voltage difference $\Delta V$ calculated in S202 (S208). As has been discussed above, the resistance of discharge resistor Rb1 and target voltage difference $\Delta V$tag determined in advance depending on the detection error of voltage sensors 211 to 21M are fixed values. Therefore, once voltage difference $\Delta V$ has been determined, current I passing when the equalization control is performed is also determined in magnitude. Therefore, by having obtained experimentally a co-relationship between equalization time T2 and current I in magnitude, equalization time T2 can be calculated from voltage difference $\Delta V$.

Subsequent steps S209 to S211 are equivalent to steps S109 to S111 in FIG. 4, and accordingly, will not be described repeatedly.

While the equalization control is executed, SMR 40 is closed, and battery pack 10 can be charged and discharged between battery pack 10 and PCU 60. When battery pack 10 is charged/discharged, it is difficult to sense the voltage of each block 101 to 10M with high accuracy, and whether the equalization control may be ended may not be determined accurately. In contrast, in the present embodiment, battery ECU 50 ends the equalization control when equalization time T2 has elapsed since the equalization control was started. By using equalization time T2, when the equalization control is ended can be determined irrespective of an effect that charging and discharging battery pack 10 has on accuracy of voltage sensors 211 to 21M sensing voltage of blocks 101 to 10M. Thus, according to the present embodiment, whether the equalization control may be ended can be determined with high accuracy.

Further, equalization time T2 is determined based on parameters relevant to a current passed through blocks 101 to 10M by the equalization control, more specifically, a resistance of discharge resistors Rb1 to RbM and target voltage difference $\Delta V$tag. Target voltage difference $\Delta V$tag is a value equal to or larger than the detection error of each sensor constituting voltage sensor group 21, and it is not an excessively small value. This can prevent the equalization control from being continued for an unnecessarily long period of time. Thus, according to the present embodiment, the equalization control can be ended before the power stored in battery pack 10 is wastefully consumed. This in turn ensures an EV travel distance as long possible.

Although the embodiments of the present disclosure have been described, it should be considered that the embodiments disclosed herein are illustrative and non-restrictive in every respect. The scope of the present disclosure is defined by the terms of the claims, and is intended to include any modifications within the scope and meaning equivalent to the terms of the claims.

What is claimed is:

1. A battery system comprising:
   a battery pack including a plurality of blocks connected in series;
   an equalizer that executes equalization control to equalize the plurality of blocks in voltage;
   a controller that obtains a determined equalization time and controls the equalizer to end the equalization control when the equalization time has elapsed since the equalization control was started; and
   a voltage sensor that senses a voltage of each of the plurality of blocks,
   wherein the equalizer includes:
      a plurality of switching elements each connected to a respective one of the plurality of blocks in parallel, and
      a plurality of discharge resistors each connected to a respective one of the plurality of switching elements in series, and
   wherein the equalization time is determined based on a resistance of the plurality of discharge resistors and a detection error of the voltage sensor.

2. The battery system according to claim 1, wherein the equalization time is a fixed value determined further based on an upper limit value of a voltage use range of the plurality of blocks.

3. The battery system according to claim 1, further comprising a relay that switches electrical connection to electrical disconnection and vice versa between the battery pack and a load, wherein
the equalization control is a process in which when the plurality of blocks have a first block and a second block with a voltage difference larger than a threshold value, the first block being higher in voltage than the second block, the first block is discharged by conducting one of the plurality of switching elements which is connected to the first block in parallel, and
the controller calculates the threshold value depending on a period of time elapsing after the battery pack is electrically disconnected from the load before the battery pack is electrically connected to the load.

4. The battery system according to claim 3, further comprising a temperature sensor that senses a temperature of the battery pack,
wherein the controller calculates the threshold value depending on the elapsing period of time and the temperature of the battery pack.

5. The battery system according to claim 1, further comprising a relay that switches electrical connection to electrical disconnection and vice versa between the battery pack and a load,
wherein the equalization time is a variable value determined further based on a voltage difference between the plurality of blocks obtained before the battery pack is electrically connected to the load by the relay.

6. The battery system according to claim 5, wherein
the equalization control is a process in which when the plurality of blocks have a first block and a second block with a voltage difference larger than a threshold value, the first block being higher in voltage than the second block, the first block is discharged by conducting one of the plurality of switching elements which is connected to the first block in parallel, and
the controller calculates the threshold value depending on a period of time elapsing after the battery pack is electrically disconnected from the load before the battery pack is electrically connected to the load.

7. The battery system according to claim 6, further comprising a temperature sensor that senses a temperature of the battery pack, wherein
the controller sets the threshold value depending on the elapsing period of time and the temperature of the battery pack.

8. A method for equalization of a battery pack, the battery pack including a voltage sensor, and a plurality of blocks connected in series, and configured such that equalization control, is executed by an equalizer, to equalize the plurality of blocks in voltage, the voltage sensor senses the voltage of each of the plurality of blocks, the method comprising:
starting the equalization control;
obtaining a determined equalization time; and
ending the equalization control when the equalization time has elapsed since the equalization control was started,
wherein the equalizer includes:
a plurality of switching elements each connected to a respective one of the plurality of blocks in parallel, and
a plurality of discharge resistors each connected to a respective one of the plurality of switching elements in series, and
wherein the equalization time is determined based on a resistance of the plurality of discharge resistors and a detection error of the voltage sensor.

* * * * *